No. 664,259. Patented Dec. 18, 1900.
T. GAUNT.
PROCESS OF SEPARATING GERMS, &c., IN MAKING STARCH.
(Application filed Sept. 1, 1896.)
(No Model.)
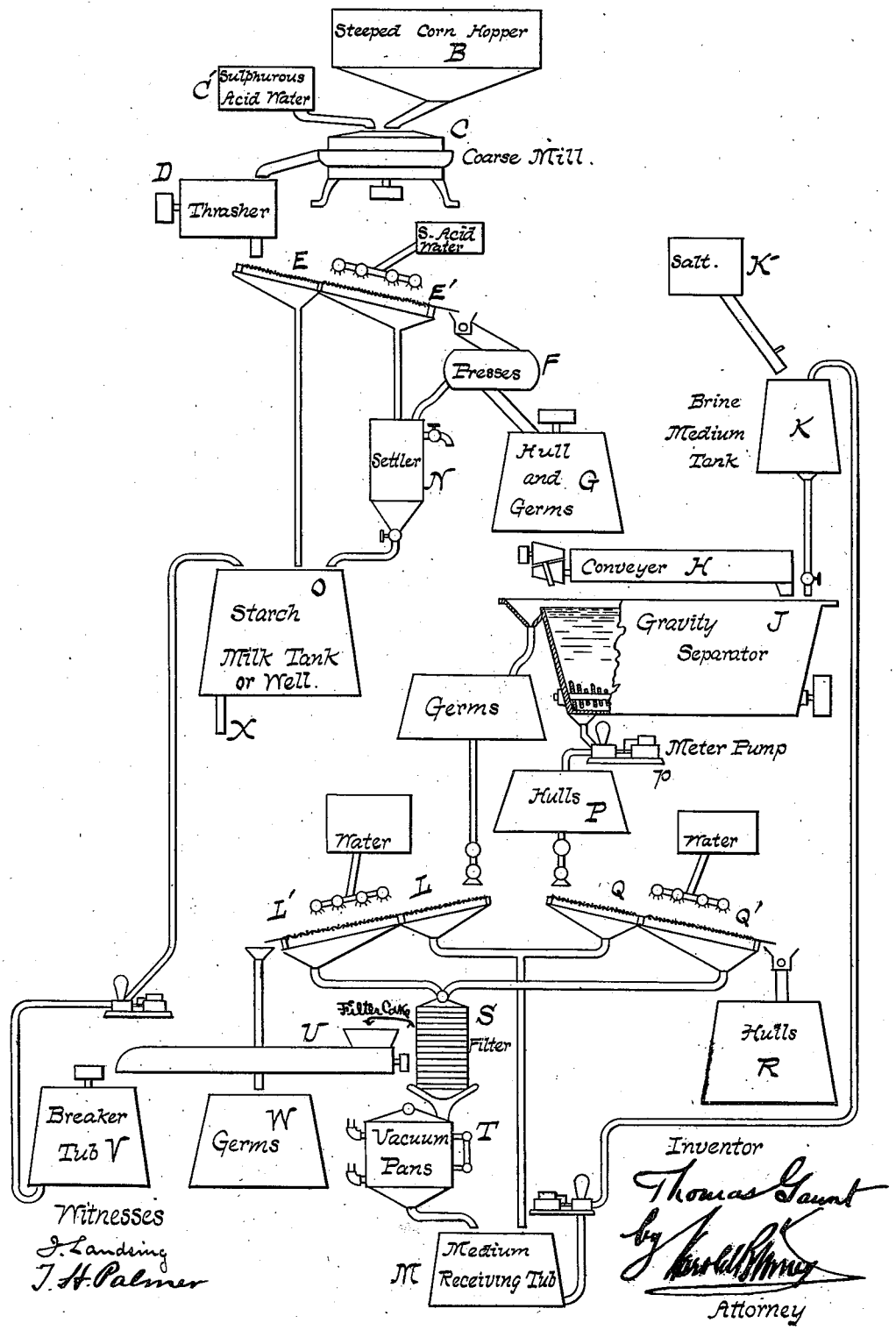
Witnesses
J. Landing
J. H. Palmer
Inventor
Thomas Gaunt
by
Attorney

UNITED STATES PATENT OFFICE.

THOMAS GAUNT, OF PEORIA, ILLINOIS, ASSIGNOR OF TWO-THIRDS TO WILLIAM HAMLIN AND HARRY HAMLIN, OF BUFFALO, NEW YORK.

PROCESS OF SEPARATING GERMS, &c., IN MAKING STARCH.

SPECIFICATION forming part of Letters Patent No. 664,259, dated December 18, 1900.

Application filed September 1, 1896. Serial No. 604,510. (No specimens.)

*To all whom it may concern:*

Be it known that I, THOMAS GAUNT, of Peoria, Illinois, (formerly of Buffalo, New York,) have invented certain new and useful improvements in treating corn and grain for the separation of the germs and the manufacture of starch, glucose, feed, oil, and other products, of which the following is a description, reference being had to the accompanying diagram, illustrating the process.

In the manufacture of oil and oil-cake from corn various different processes have been employed for separating the germs from the perisperm and husks. The present process forms an improvement by which the germs may be thoroughly and conveniently separated from the starch, perisperm, and husks or hulls by the use of a brine or other separating medium of density about 10° to 15° Baumé, which causes the germs to rise to the surface and the hulls to sink to the bottom. The complete process which forms the subject-matter of the present application consists of several successive steps or subprocesses, all tending to the more ready and perfect separation of the germs and to the economy of the process.

Briefly stated, the present process is as follows: The corn after it has been steeped in sulfurous-acid water is first rolled and broken, but not ground, in certain mills, as will be more fully explained, and is then threshed to further loosen the germs and starch and run onto shaker screens or sieves, where the starch liquor passes off from the ground corn and where, preferably, the ground corn is washed to free it as much as possible from the starch. It is then run through squeezers or pressers, which still further free the commingled hulls and germs from starch and water. The hulls and germs are then immersed in a separator-tank in a solution of a gravity of from 10° to 15° Baumé. This solution or medium may be brine or any other solution possessing the desired density. Brine is preferable because it is convenient, and to some extent it improves the feed. The germs, coming into the tub, rise by their lesser gravity and are collected over a weir, with a portion of the separator medium. They are then carefully washed upon shaker-sieves to recover the medium and to free the germs from all traces of it. The hulls, settling to the bottom of the medium, are drawn off and similarly washed upon shaker-sieves. The germs are then ready to be dried and pressed to extract the oil or to be treated in any other way desired. The hulls after being washed upon the shaker-screens are preferably reground with water in fine-grind mills, after which the starch, thereby freed from the hulls, is separated from the hulls in any desirable manner. The brine or separator medium which runs through the screens upon which the germs and the hulls are washed is filtered to extract such starch as may have been carried off with it and then concentrated and returned to the medium-tank in order that the medium may be used over and over again. The starch-milk from the shaker-screens upon which the coarse-ground hulls and germs are first received is ready to be treated with other starch-milk for the separation of the feed and the gluten it may contain. Such, briefly, is a general outline of my new process, and I will now proceed to describe the various details of the process as illustrated by the use of brine solution in the separator, referring to the accompanying illustrative diagram. It must not be supposed, however, that the accompanying diagram is intended in any way to show the details of the individual apparatuses or the arrangement in a factory, as such details must be determined in each individual case and in no respect form an essential of my process.

The corn after it has been steeped in sulfurous acid, and thereby softened, is run with an additional amount of weak sulfurous-acid or starch water into a specially-dressed bur-mill C. The stones of this mill are set so far apart that they press and roll the kernels, and so break them into coarse particles and to some extent loosen the germs from the starch and the starch from the hulls; but no grinding takes place, nor are the germs themselves in any way injured. After being thoroughly steeped or soaked the germs, indeed, possess such toughness that they can only be injured by direct crushing between two hard surfaces. The dress and adjustment of the mill, as stated, are such that crushing or grinding action cannot take place. From these breaking-mills the ground corn may be run through threshers, mixers, and centrifugal pumps to the shakers. In passing through the threshers, mixers, and pumps the germs are more thoroughly loosened from the adherent perisperm and the starch is to a large extent removed from the hulls. One thresher only, at D, is shown in the diagram. So far in the process the treatment is identical to that described more in detail in another application, serially numbered 604,509, filed September 1, 1896, and pending concurrently with this application. In falling upon the shaker-screen E the starch liquor runs through the screen, beneath which it is caught undiluted and carried to a tank or well, as at O, for further treatment for the extraction of feed, starch, and gluten. On the lower portion E' or on separate shakers the commingled hulls and germs are thoroughly washed free from the remaining starch liquor, so that the tailings from these shaker-sieves contain little or no free starch. The starch-water collected from the lower portion E' of the shaker-sieve is concentrated by settling, as at N, and is then mixed with the heavy or undiluted starch-milk, as at O. The commingled germs and broken hulls pass from the end of the shaker-screens E E' into presses F, where most of the remaining water is squeezed out. The water so expressed is concentrated by settling, as at N, and yields an additional amount of starch and gluten. The pressed hulls and germs are then fed through suitable conveying devices H into the separator-tank J. This separator-tank contains the brine at a density of about 10° to 15° Baumé, and in this medium the germs quickly rise to the surface. The medium is supplied from the medium-tank and sufficient flow of the medium is preserved to give the proper surface currents for carrying the germs to the weir end of the separator, where they pass over the weir with a certain portion of the medium. The hulls, sinking to the bottom, are carried along the bottom of the separator to the far end, where they are drawn off with a determinate portion of the medium by means of a meter-pump or other apparatus $p$. It is therefore clear that the hulls and germs leave the presses and enter the separator medium in a but slightly-moist condition, practically without free starch liquor. The object of this is that the hulls and germs being moist may not take up and absorb the medium, and, on the other hand, being freed from starch may not dilute the medium by carrying into it a quantity of water or liquor of different character or density. If the flow of the medium is not sufficient to carry the hulls along the bottom of the separator, spirally-arranged paddles may be used to effect the proper circulation and to convey the hulls to the outlet. The details of the separator form the subject of another application for patent. The medium is recovered from the germs and hulls and the germs and hulls, respectively, washed free of the medium in the following manner: The germs, with the medium which flows out of the separator with them, are received upon the upper portions of a set of shaker-screens L, and the medium passing through the screen is collected and run to a receiving-tub, as M. On the lower portions L of these shakers or on other ones sprinklers are arranged and the germs thoroughly washed free of the brine and of such starch liquor as may be mixed with it. This diluted brine liquor passing through the screen is filtered, as at S, to extract the starch and is then concentrated in vacuum-pans T to its original density and run into the medium-receiving tub M. Substantially the same treatment is given to the hulls, which pass over shaker-sieves Q Q', are washed, and received in a tub or tank R ready for grinding and further treatment. The germs may be dried and pressed or otherwise treated. The hulls may be ground in fine-grind mills and treated for starch, gluten, and feed in any desirable manner. The starch, (in cakes,) which is extracted by the filter-press S from the diluted brine, is broken up, as at V, and mixed with the starch-milk from the other sources, as at O. This starch-milk may be treated in the usual way for the extraction of starch, gluten, and the fine feed that has passed through the sieves and is still retained by it. The medium is pumped from the receiving-tub M back to a medium-tank K ready to be used over again. It is therefore clear that the medium flowing from the medium-tank K through the separator J and out of the separator J with the germs and hulls is afterward recovered and sent back to the medium-tank at the same density—about 15° Baumé. There is little loss of the medium. A very slight loss is due to the fact that the germs and hulls, though wet when introduced, absorb and retain some of the brine or other medium; but this loss is inconsiderable and is readily compensated for by the addition of fresh salt or brine from a supply-tank K' to preserve the desired quantity. Indeed, the slight amount of salt which passes with the hulls into the feed tends to improve the feed, giving it a better flavor and also tending to prevent it from souring.

In place of a brine medium any other solution may be used. For some reasons it is preferable to use a solution formed from the corn products, such as the steep-water solution from steeping the corn preliminary to the breaking and threshing process. When this steep liquor is used, such portions as remain ultimately in the feed are of no disadvantage whatever, as all the products of the steep after being concentrated may with advantage be mixed with the feed and greatly improve its quality, as set forth in another application filed by me November 19, 1895, Serial No. 569,386, and pending concurrently with this. There is a great distinction between using brine or other true "solution" and using the so-called "starch" solution in the separator, for the starch solution is not a true solution, but a medium formed by the suspension of the starch particles, which quickly settle when the solution stands quietly. For this reason it has been difficult to keep up a uniform density in the separator in excess of 12° Baumé and constant stirring is necessary to prevent the starch from settling. Indeed, if the germs are separated from the hulls in a starch medium and all then allowed to stand for a few hours the starch settles, allowing the germs to sink, with the starch suspended in the body of the liquid above the starch particles. Where brine or other true solution is used, no such effect takes place, and as the density can be preserved at 15° Baumé without trouble and without agitation the germs rise quickly to the surface and remain there.

In my other application, Serial No. 604,509, filed with this I have set forth a process by which I employ starch solution in the separation of the germs and hulls. One advantage of the process described in this present application lies in the use of a true solution which does not have to be violently agitated to preserve its density and which may be conveniently made of much greater density than that at which a starch solution can be satisfactorily employed. In the more limited aspect of the present process it is restricted to the use of brine or other substance foreign to the corn, but in its broader aspect may include any solution formed in the treatment of the corn—as, for instance, the steep solution or even a glucose solution. In any case it is desirable to recover the solution by washing it from the hulls, as the larger portion of a true solution held by the hulls would finally run off from the starch-tables with the gluten-water and from the gluten-settlers into the sewer.

In mentioning the addition of sulfurous-acid water in the mills and in other instances it must not be understood that I am in any way limited to this, as water or starch-water may be used. Sulfurous-acid water is, however, of advantage in assisting the separation of starch from the germs and hulls, and I have made this the subject of claims in the application filed herewith, as above referred to. I also desire to be understood that in using the term "medium" I mean to include any separating medium by which the germs are caused to float and the hulls to sink.

I have now set forth my process and diagrammatically illustrated and described it in its preferred form. I have purposely omitted the enumeration of certain details and certain variations which are matters of mere skill in the art, because to set these forth at length would obscure rather than make clear the more essential features; but I lay claim to the following:

1. The improved process of treating cereals, substantially as set forth: by breaking or otherwise reducing the corn with water; washing the commingled hulls and germs free of the starch liquor produced; immersing and separating the washed hulls and germs in a separator medium consisting of a solution of a soluble substance foreign to the said cereals, of a suitable density; and thereafter recovering the said solution from the said germs and the said hulls, and reintroducing it with the separator, supplying the solution at the required density and drawing it off, independently of the amount of hulls and germs supplied.

2. The improvement in the process of treating cereals, substantially as set forth: which consists in coarsely breaking, or otherwise partially reducing without grinding the corn; washing the commingled hulls and germs free from the starch liquor produced; immersing and separating the hulls and germs in a separator medium consisting of brine, of proper density; drawing off the germs from above and the hulls from below; supplying the solution at the required density and drawing it off, independently of the amount of hulls and germs supplied; recovering the said medium from the said germs and hulls and washing the said germs; thereafter grinding the hulls with water and separating the hulls from the starch liquor thereby produced.

3. The improvement in the process of treating cereals, for the separation of germs, substantially as set forth: which consists in washing the ground hulls and germs free from starch liquor; then immersing the ground hulls and germs in a brine solution of suitable density; floating and collecting the said germs, and drawing off the said hulls from below; supplying the solution at the required density and drawing it off, independently of the amount of hulls and germs supplied; thereafter recovering the said solution by screening and washing; restoring the said solution to its original density, compensating, as required, for loss; and reusing the said solution for the further separation of germs and hulls.

4. In the process of treating cereals, the separation of germs, hulls, and starch liquor by first freeing the ground or otherwise prepared hulls and germs from starch liquor and immersing them in a solution of suitable density; and by supplying and drawing off the said solution independently of the amount of hulls and germs supplied thereto; whereby any desired circulation may be established and maintained regardless of the amount of cereals treated.

5. The improvement in the process of treating cereals for the separation of germs, which consists in disintegrating the cereal and then washing away the starch particles disengaged during the process of disintegration and mixing the disintegrated grain freed from said starch particles with water the density of which has been increased by the addition of salt or other soluble ingredient.

In testimony whereof I have hereunto set my hand at New York, N. Y.

THOMAS GAUNT.

Witnesses:
GEORGE H. SONNEBORN,
HAROLD BINNEY.